(12) United States Patent
Takekata et al.

(10) Patent No.: US 6,854,483 B2
(45) Date of Patent: Feb. 15, 2005

(54) MANUAL CONTROL MECHANISM FOR LIFT UNIT

(75) Inventors: Mitsuhiro Takekata, Sakai (JP); Tsukasa Wada, Sakai (JP); Kiyokazu Nakanishi, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/655,754

(22) Filed: Sep. 5, 2003

(65) Prior Publication Data

US 2004/0124391 A1 Jul. 1, 2004

(30) Foreign Application Priority Data

Oct. 23, 2002 (JP) ........................................ 2002-308702

(51) Int. Cl.$^7$ .............................................. F15B 13/04
(52) U.S. Cl. ................................. 137/625.69; 91/389
(58) Field of Search ........................ 91/389; 137/625.69

(56) References Cited

FOREIGN PATENT DOCUMENTS

JP        2001-169607        6/2001

Primary Examiner—Gerald A. Michalsky
(74) Attorney, Agent, or Firm—Webb Ziesenheim Logsdon Orkin & Hanson, P.C.

(57) ABSTRACT

A manual control mechanism for a lift unit having a lift arm and a hydraulic cylinder for lifting the lift arm up and down. The mechanism includes a control valve configured as a three-position switchover valve for selectively providing lowering, neutral and elevating conditions according to a spool position for controlling movement of the hydraulic cylinder, a lift lever for manually operating the control valve and an operational path for guiding operational displacement of the lift lever. The operational path includes an inching operational path for operating the hydraulic cylinder at a creeping speed by slightly opening a port of the control valve and a main operational path for operating the control valve over an entire stroke range thereof. An operational feel when the lift lever is operationally displaced along the inching operational path is different from an operational feel when the lift lever is operationally displaced along the main operational path.

8 Claims, 11 Drawing Sheets

MANUAL CONTROL MECHANISM FOR LIFT UNIT

BACKGROUND OF THE INVENTION

1. Field of the Invention

The present invention relates to a manual control mechanism for a lift unit having a lift arm and a hydraulic cylinder for lifting the lift arm up and down. More particularly, the invention relates to a manual control mechanism of the above-noted type including a control valve configured as a three-position switchover valve for selectively providing lowering, neutral and elevating conditions according to a spool position for controlling movement of the hydraulic cylinder, a lift lever for manually operating the control valve and a operational path for guiding operational displacement of the lift lever.

2. Description of the Related Art

As known from the Japanese Patent Application "Kokai" No.: 2001-169607, as a mechanical control valve responsible for operation of a hydraulic cylinder of a lift unit mounted on e.g. a tractor, a position control valve is often employed. In a low-cost version of such construction, a control valve employed is usually of a simple manual operation type three-position switchover valve.

With such position control valve, the lift arm is lifted up and down according to an operation position of a position lever, so that e.g. a plowing depth for a rotary plowing operation can be easily set. On the other hand, with this valve, there occurs a certain amount of hysteresis in the course of the lifting operation, it is difficult to effect e.g. a grading operation which requires a fine lift adjustment on the order of a few millimeters.

SUMMARY OF THE INVENTION

The present invention has been made in view of the above-described state of the art. A primary object of the present invention is to provide a manual control mechanism which uses a three-position switchover type control valve advantageous for simple construction and low cost, yet which allows fine lift adjustment.

For accomplishing the above-noted object, according to the present invention, a manual control mechanism of the above-noted type comprises: a control valve configured as a three-position switchover valve for selectively providing lowering, neutral and elevating conditions according to a spool position for controlling movement of the hydraulic cylinder, a lift lever for manually operating the control valve and an operational path for guiding operational displacement of the lift lever;

wherein said operational path includes an inching operational path for operating the hydraulic cylinder at a creeping speed by slightly opening a port of the control valve and a main operational path for operating the control valve over an entire stroke range thereof; and wherein an operational feel when the lift lever is operationally displaced along said inching operational path is different from an operational feel when the lift lever is operationally displaced along said main operational path.

With the above-described construction, when the lift lever is operated along the inching operational path, the hydraulic cylinder can be operated at the "creeping" (very low) speed. Whereas, when the lift lever is operated along the main operational path, the hydraulic cylinder can be operated at a normal speed. Further, the operational feel provided to the operator when the lever is operated along the inching operational path is rendered different from that when the lever is operated along the main operational path. Hence, the operator can easily feel or recognize which of the operational paths the lift lever is being displaced along, without visual confirmation. Therefore, while this construction employs the simple and economical three-position switchover type control valve, the operator can effect a fine lift adjustment by using the operation (lift) lever, for carrying out a grading operation or the like effectively.

According to one preferred embodiment of the present invention, said main operational path extends parallel with and by a greater length than said inching operational path; and mutually opposed sides of said main operational path and said inching operational path are open to allow movement of the lift lever between the main operational path and the inching operational path. With this construction, the operator can select either the inching operational path having a short stroke or the main operational path having a long stroke by moving the lift lever to the right or the left. As a result, the creeping speed lift adjustment using the inching operational path or the high speed lift adjustment using the main operational path can be effected selectively and efficiently.

According to a further embodiment of the present invention, said manual operation mechanism is mounted on a tractor; and said inching operation path is disposed close to a driver's seat of the tractor and said main operational path is disposed distant from the driver's seat. With this construction, when the operator operates the lift lever along the inching operation path close to the driver's seat, the operator may feel some awkwardness. This, however, does not impose a serious problem since the inching operational path has only a short stroke. Hence, the nearness of the path will rather facilitate the fine adjustment operation. On the other hand, when the operator operates the lever along the main operational path distant from the driver's seat, the lever operation along this path having a long stroke can be effected comfortable and easily with the good space between the path and the seat.

According to a still further embodiment of the present invention, said lift lever is laterally urged from the main operational path toward the inching operational path. With this construction, when the lift lever is located in the inching operational path, the lever will be automatically displaced closer to the driver's seat. And, when the lever is moved away of the driver's seat against the urging force, the lever will be positioned in the main operational path. Therefore, in case an implement operably coupled with the lift unit is to be lowered to a working height, the operator will first move the lift lever into the main operational path and operate it to a lowering position. Then, when the implement has been lowered approximately to the target height, the operator will return the lift lever to the neutral, whereby the lift lever will be automatically shifted to the inching operational path by the lateral urging force. Thereafter, with an inching operation along this inching operational path, the operator can effect fine lift adjustment for moving the implement to the exact target height without overshooting.

According to a still further embodiment of the present invention, at each opposed end of the inching operational path, there is formed an inclined guide portion for shifting the lift lever to the main operational path. With this construction, when the operator operates the lift lever rather unconsciously along the inching operational path, as this lever comes into abutment against the inclined guide portion, the abutment provides resistance against further movement of the lever in that direction. Hence, inadvertent shift of the lever from the inching operational path to the main operational path can be avoided advantageously. Further, the abutment and resistance from the inclined guide portion gives the operator positive awareness of the lever being now located at the end of the inching operational path. Then, with this awareness, the operator can forcibly move the lever against the inclined guide portion, so that the lever will ride over the guide portion and will be shifted into the main operational path. Therefore, during the lift adjustment operation along the inching operational path the operator will not shift the lever into the main operational path inadvertently to invite overshooting of the implement. So that, the fine lift adjustment can be effected easily. Moreover, the shifting of the lift lever from the terminal end of the inching operational path to the main operational path does not require any lateral positive operation of the lever and this is made possible simply by strongly operating the lever in the same direction as the inching operational path, so that the lever will ride over the inclined guide portion and be shifted into the main operational path. In this manner, the switchover for moving the implement largely can be effected easily, thus achieving improvement in the maneuverability.

According to a still further embodiment of the present invention, said inching operational path incorporates neutral return means for automatically returning the lift lever to an operational displaced position corresponding to a neutral position of said control valve. With this construction, when the implement is to be elevated or lowered largely by an operation along the main operational path, as the operator returns the lift lever from the main operational path into the inching operational path and then releases his/her hand from the lever, the lift lever is automatically returned to the neutral and then the elevating or lowering movement of the implement is stopped. Further, in a lift adjustment along the inching operational path, the lift lever is automatically returned to the neutral and the elevating or lowering movement of the implement is stopped simply by the operator's releasing his/her hand from the lift lever. Therefore, the returning operation of the lift lever to the neutral position can be effected easily and speedily, and the corresponding elevating/lowering operation of the implement to a desired height and stopping the implement at that position can be effected easily.

According to a still further embodiment of the present invention, said lift lever is subjected to the neutral return effect from said neutral return means substantially over an entire stroke range of the inching operational path. With this construction, when the lift lever is shifted out of the inching operational path into the main operational path, the lever is released from the automatic return effect, so that the elevating or lowering operation will proceed as it is continuously. Therefore, the operator can readily recognize the operational range or stroke where the automatic return effect is effective. Hence, the operator can easily make selection of such operations as a continuous elevation or lowering of the implement or speedy stop of the implement.

According to a still further embodiment of the present invention, a spool of said control valve and said lift lever are directly coupled with each other. With this construction, there exists no link mechanism or the like between the lift lever and the spool. Hence, there occurs no hysteresis during switchover of the lift operation. Accordingly, it becomes possible to lift up or down the implement to a desired height and stop it there with high precision. Therefore, a fine height adjustment of the implement requiring high precision such as for a grading operation can be effected easily.

Further and other features and advantages of the present invention will become apparent upon reading the following detailed disclosure of the invention with reference to the accompanying drawings.

DESCRIPTION OF THE PREFERRED EMBODIMENTS

Figure 1:
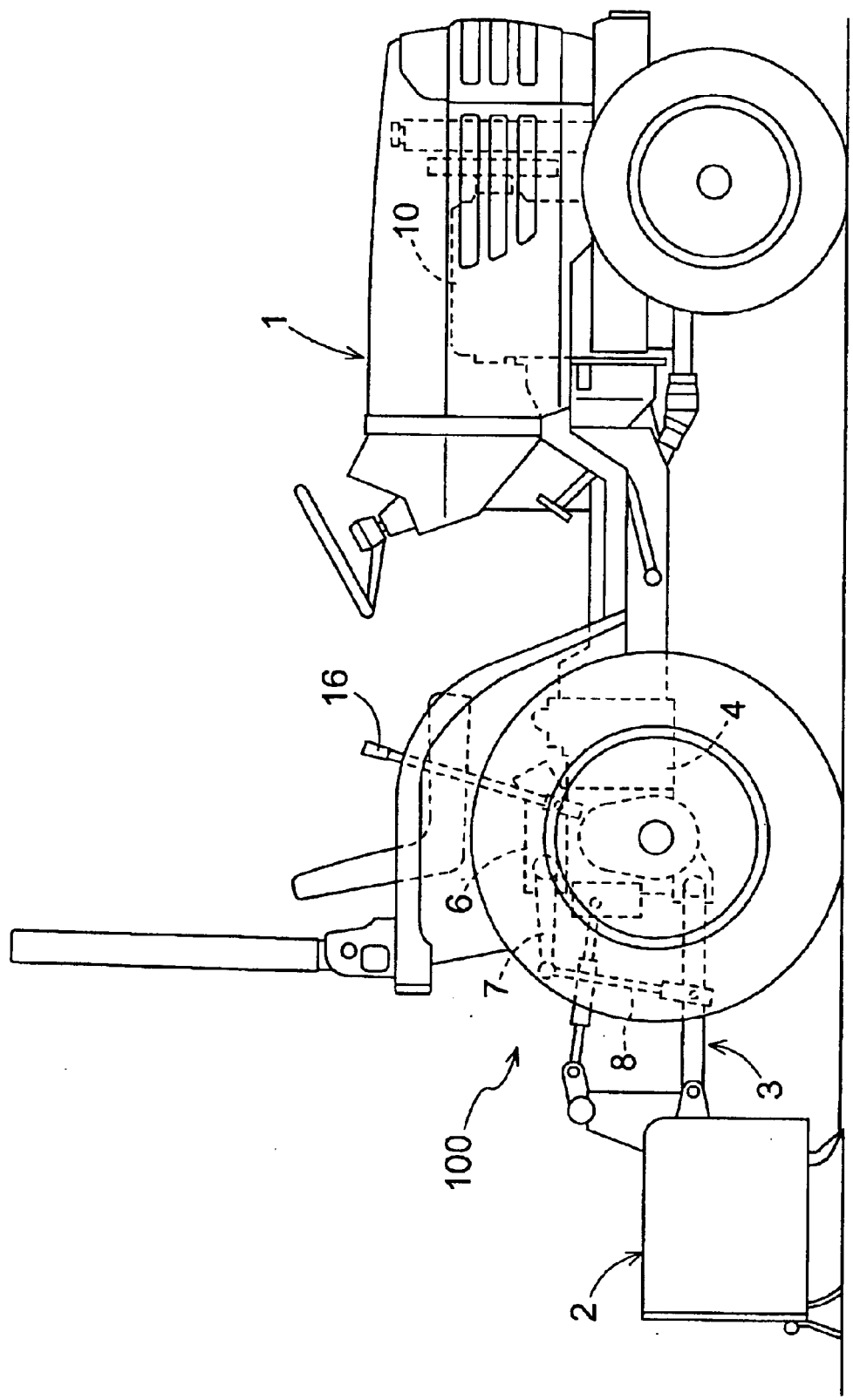
FIG. 1 is an overall side view showing a tractor implementing a manual control mechanism according to the present invention.

FIG. 1 shows an agricultural tractor including a tractor body 1 and a box blade 2 as an example of a grading implement connected to the rear of the tractor body 1, with the box blade 2 being liftable up and down via a lift unit. A link mechanism for this lift unit is constructed as a three-point link mechanism 3. The lift unit further includes a single-acting hydraulic cylinder 5 and pair of right and left lift arms 7.

The tractor body 1 mounts a rear transmission casing 4, to an upper portion of which an upper casing 6 is connected.

And, the single-acting hydraulic cylinder 5 is accommodated in this upper casing 6. The lift arms 7 attached to the upper casing 6 and the three-point link mechanism 3 are operably coupled with each other via a lift rod 8. And, a control valve 9 for controlling the operation of the hydraulic cylinder 5 is attached to the bottom face of the upper casing 6.

Figure 2:
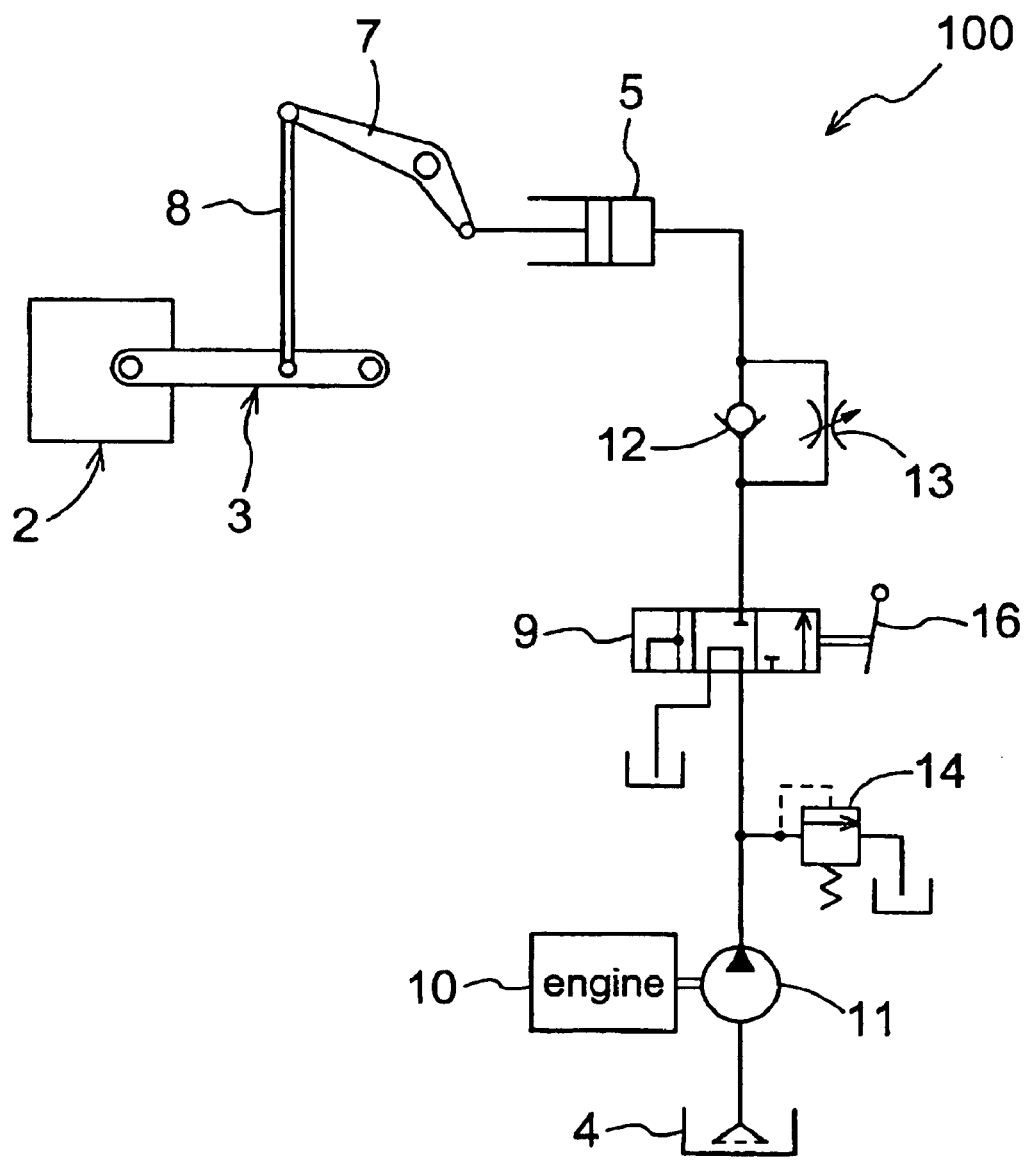
FIG. 2 is a diagram of a hydraulic circuit for controlling a lift unit.

The control valve 9 is configured as a three-position switchover valve for selectively providing lowering, neutral and elevating conditions according to a spool position. As shown in the hydraulic circuit diagram of FIG. 2, a pump port P of this valve 9 is connected to a pump 11 driven by an engine 10. In operation, a lubricant oil as a work oil reserved in the rear transmission casing 4 is drawn by the pump 11 to be supplied to the control valve 9. Then, the oil discharged from the control valve 9 is returned directly to the rear transmission casing 4. Further, a cylinder port C of this control valve 9 is connected via a check valve 12 and a lowering-speed adjusting valve 13 to the hydraulic cylinder 5, so that with restriction of the oil to be discharged from the hydraulic cylinder 5 by an oil passage constricting adjustment of the lowering-speed adjusting valve 13, the self-weight lowering speed of the lift arm 7 is adjusted. Incidentally, the maximum pressure of the pressure oil to be supplied to the hydraulic cylinder 5 is limited by a relief valve 14.

Figure 6:
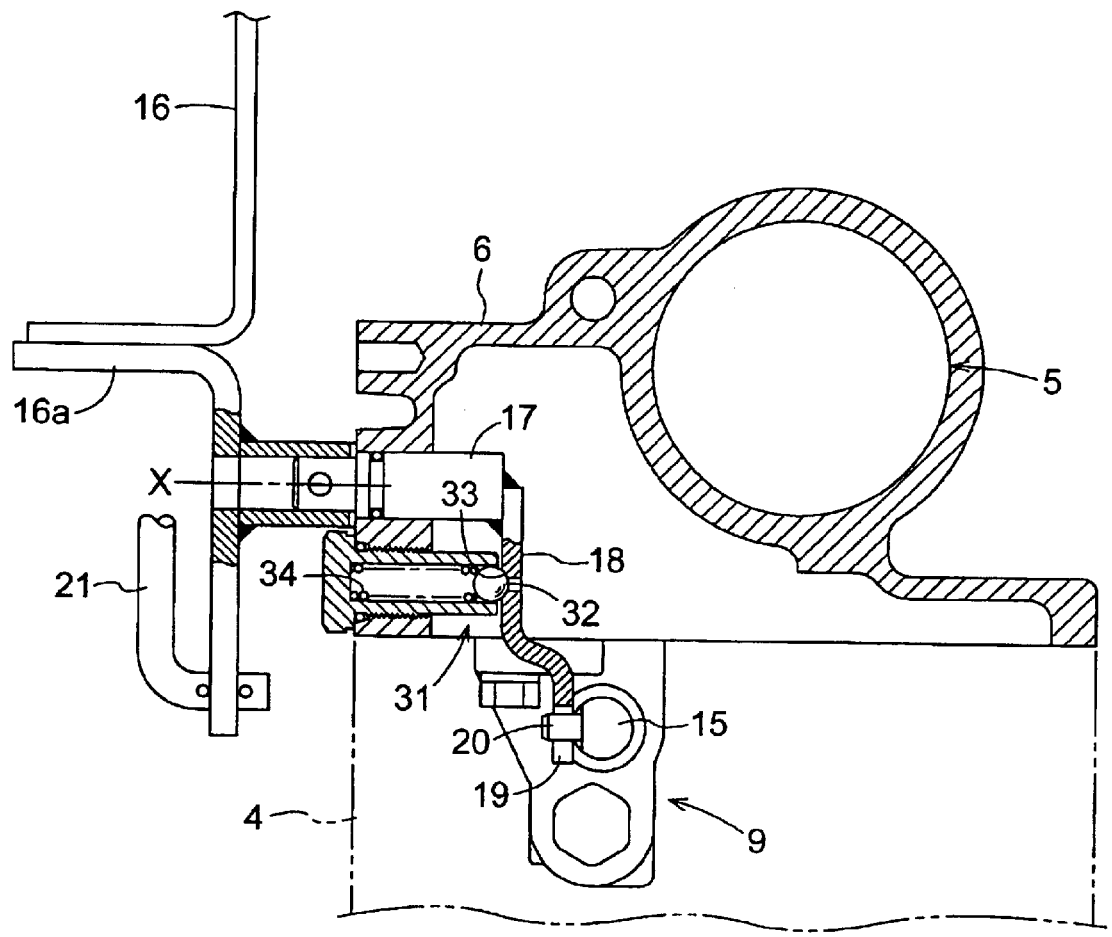
FIG. 6 is a front view showing an operational range of the control lever.
Figure 8:
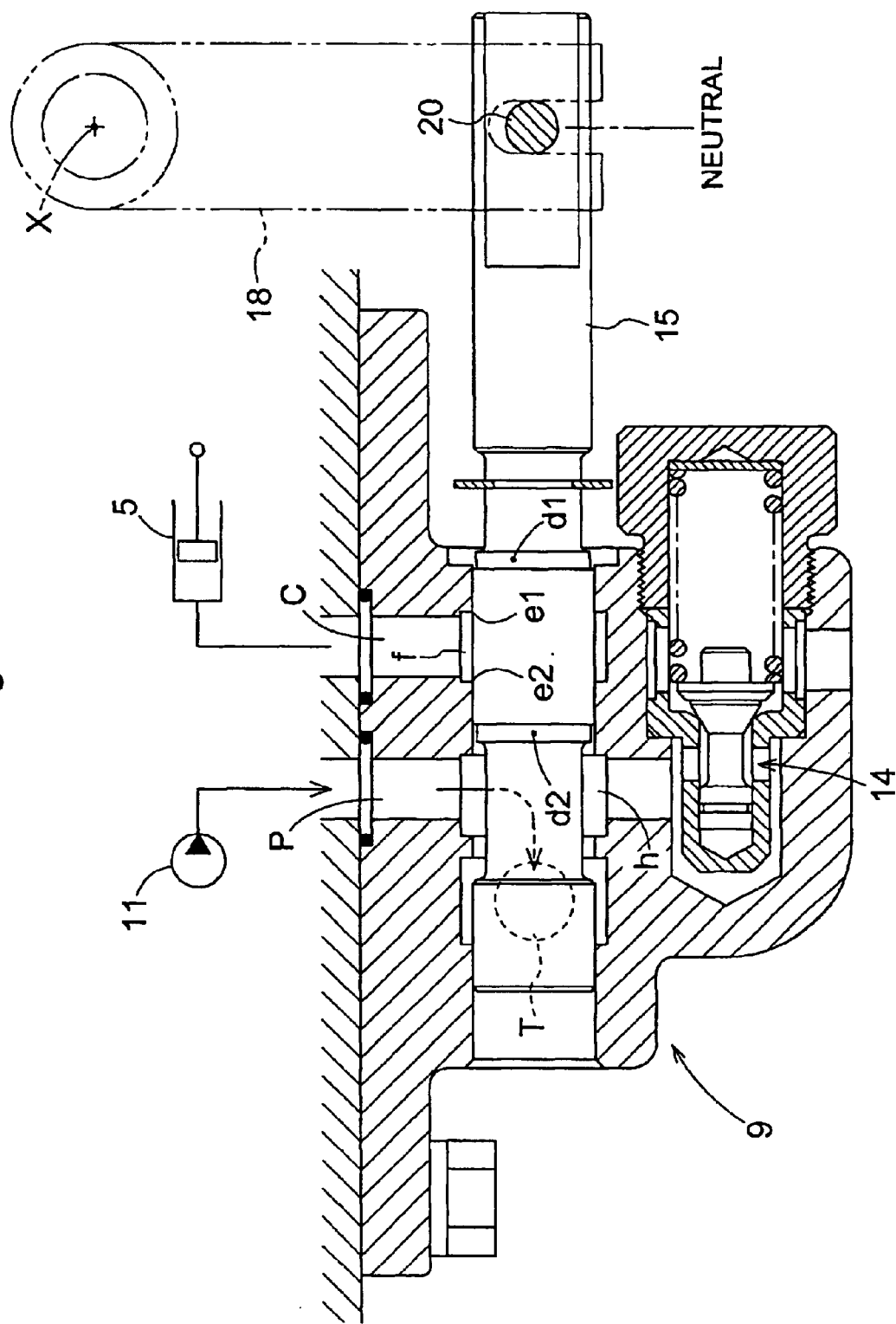
FIG. 8 is a side view in vertical section showing NEUTRAL condition of the control valve.
Figure 9:
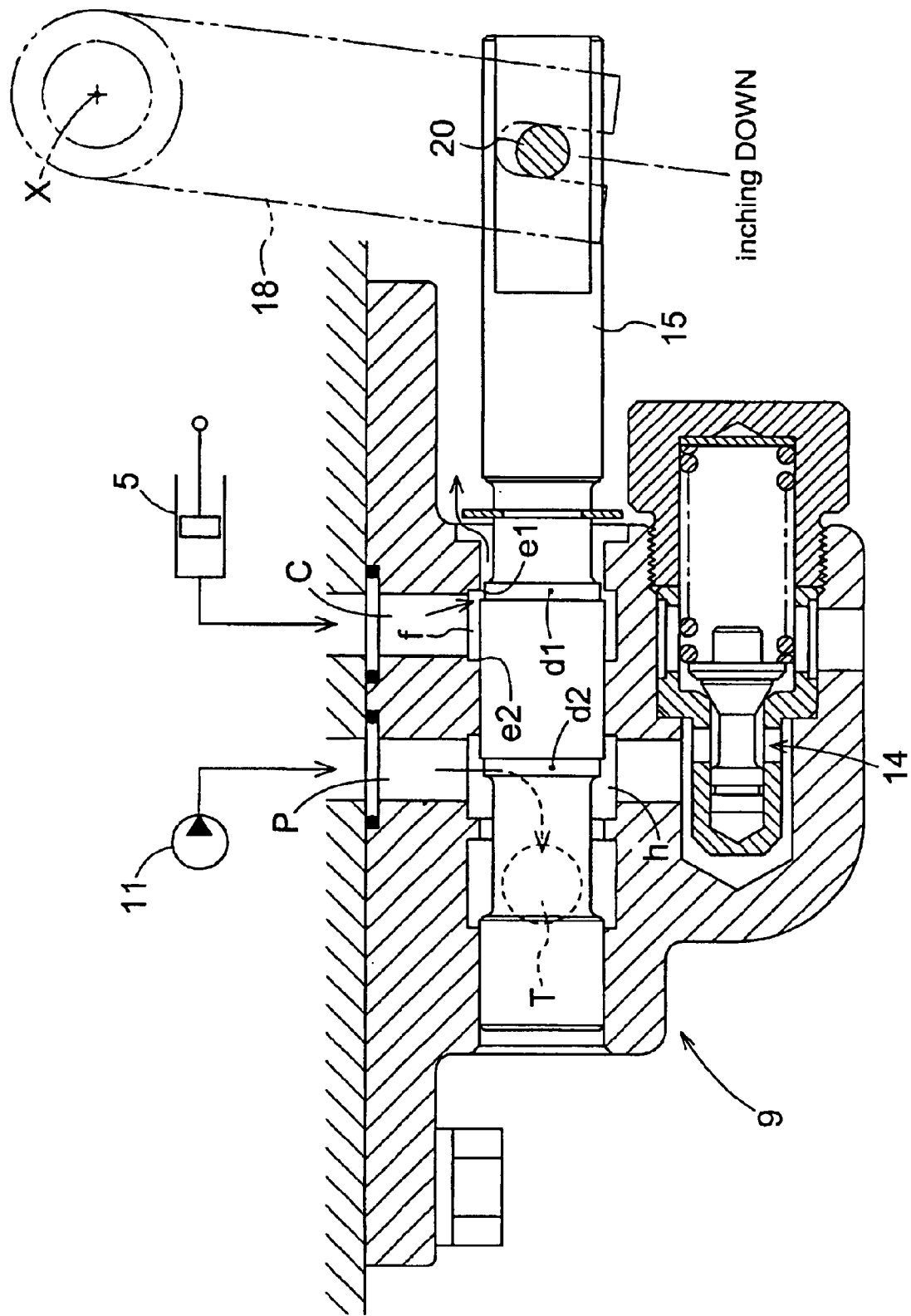
FIG. 9 is a side view in vertical section showing an "inching DOWN" condition of the control valve.

FIGS. 6 and 8 show in details the principal portion of the control valve 9. A spool 15 of this control valve 9 is slidable in the fore and aft direction and a front projecting end of this spool 15 is operably coupled with a lift lever 16 attached to the right side face of the upper casing 6 to be pivotable in the fore and aft direction about a pivot X. More particularly, a base end member 16a of the lift lever 16 is fixedly connected to an outer end of a support shaft 17 rotatably inserted through a side face of the upper casing 6 to be rotatable about the pivot (a) and also an operational arm 18 is fixedly connected an end of the support shaft 17 within the casing. And, a pin 20 attached to and projecting forwardly from the spool 15 is engaged without looseness within an engaging groove 19 defined at the lower end of this operational arm 18. So that, in association with a forward or rearward pivotal movement of the lift lever 16, the spool 15 is directly pushed or drawn out.

Figure 10:
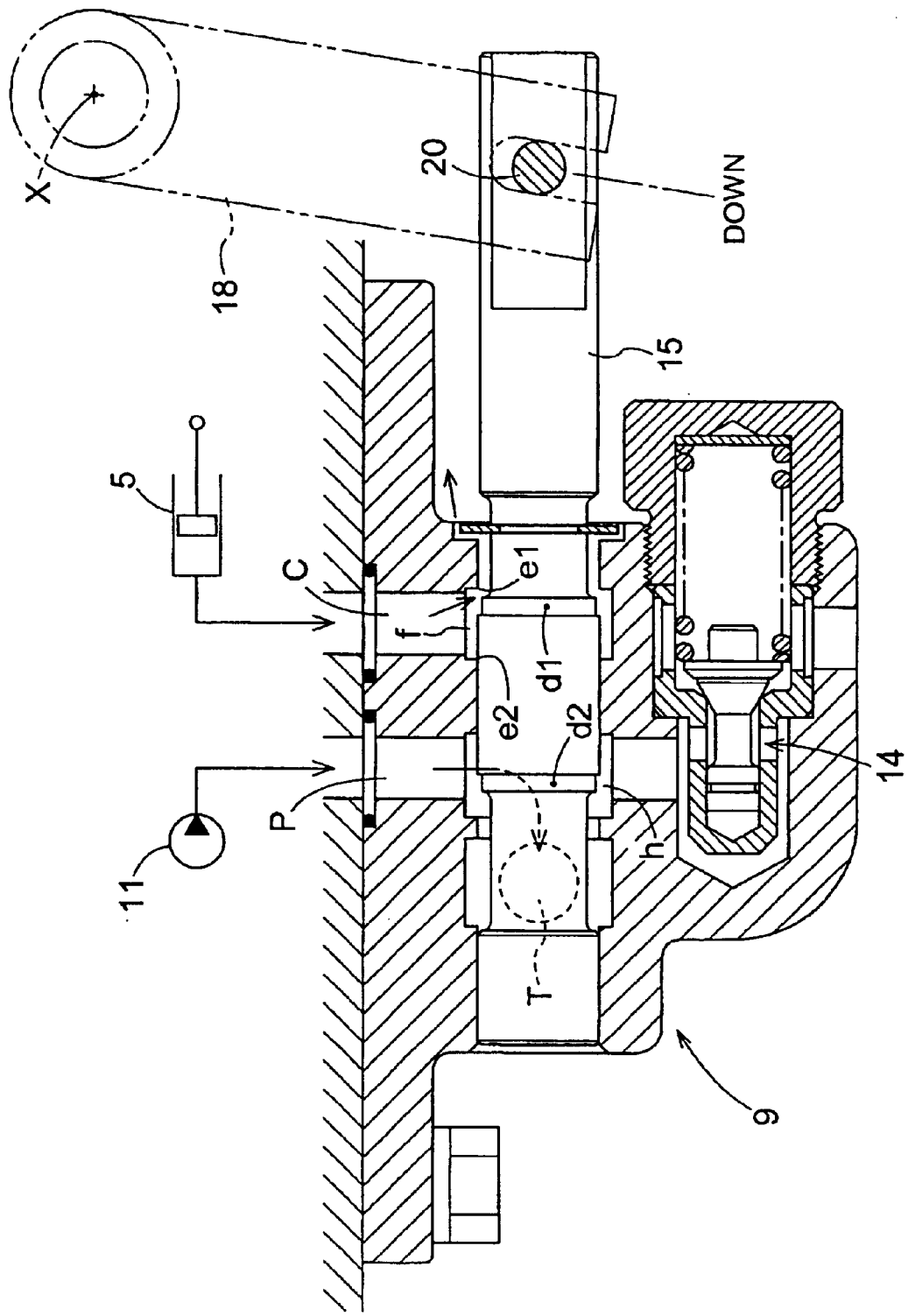
FIG. 10 is a side view in vertical section showing DOWN condition of the control valve.
Figure 12:
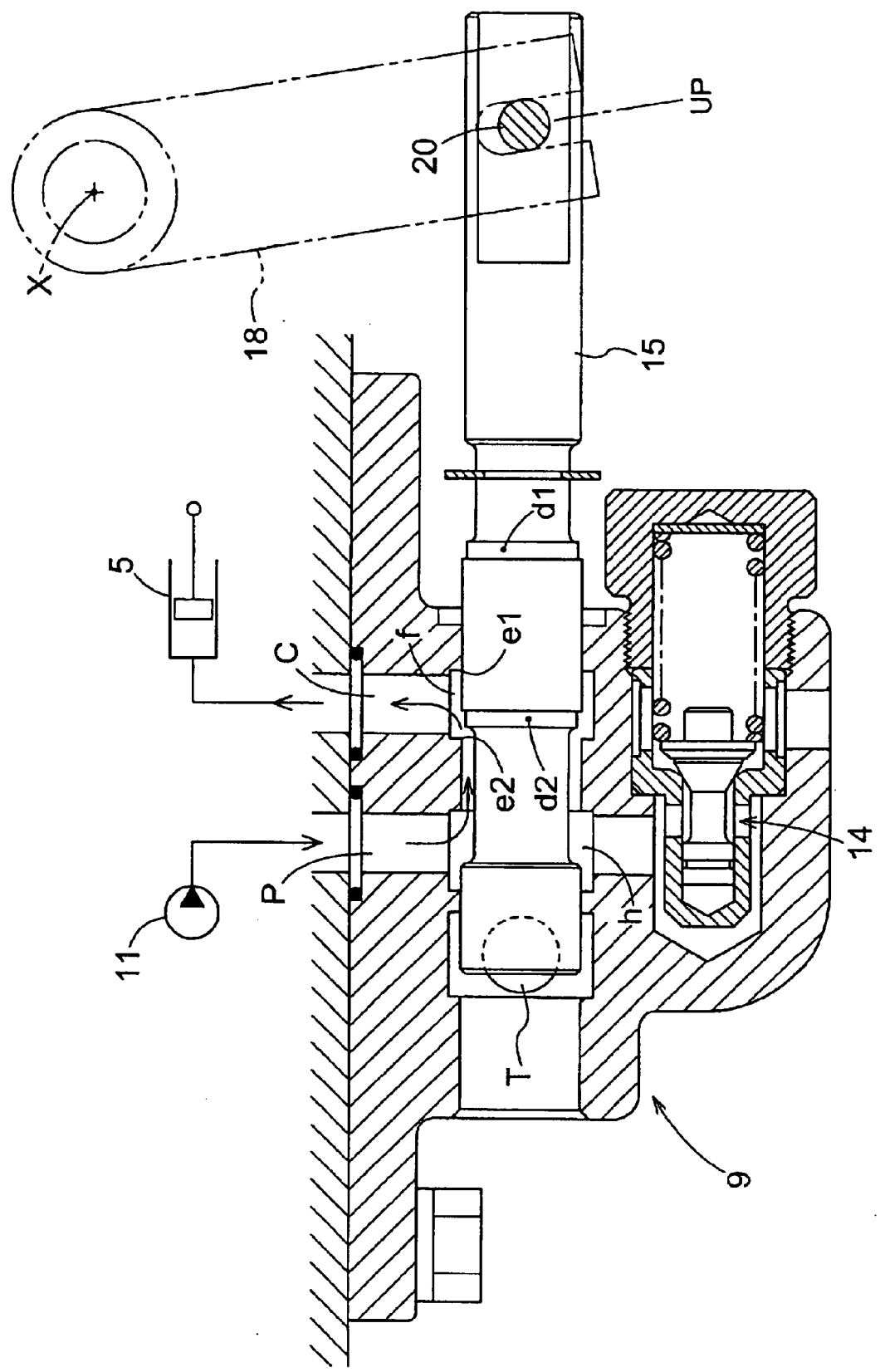
FIG. 12 is a side view in vertical section showing UP condition of the control valve.

As shown in FIG. 8, when located at its intermediate position in the fore and aft stroke thereof, the spool 15 is under the "NEUTRAL" condition where the cylinder port c is blocked and the pump port P is communicated with the tank port T. When pulled out forwardly as shown in FIG. 12, the spool 15 is under the "UP" condition where the pump port P is communicated with the cylinder port C. Further, when pushed rearwards as shown in FIG. 10, the spool 15 is under the "DOWN" condition where the cylinder port C and the pump port P are open within the transmission casing. Therefore, when the lift lever 16 is located at an intermediate position in its operational stroke range, the spool 15 is under the "NEUTRAL" condition and the lift arm 7 is fixed in position. When the lift lever 16 is largely pivotally operated to the forward, the spool 15 is pushed in to enter the "DOWN" condition. When the lever 16 is largely pivotally operated to the rearward, the spool 15 is pulled out to enter the "UP" condition.

Figure 3:
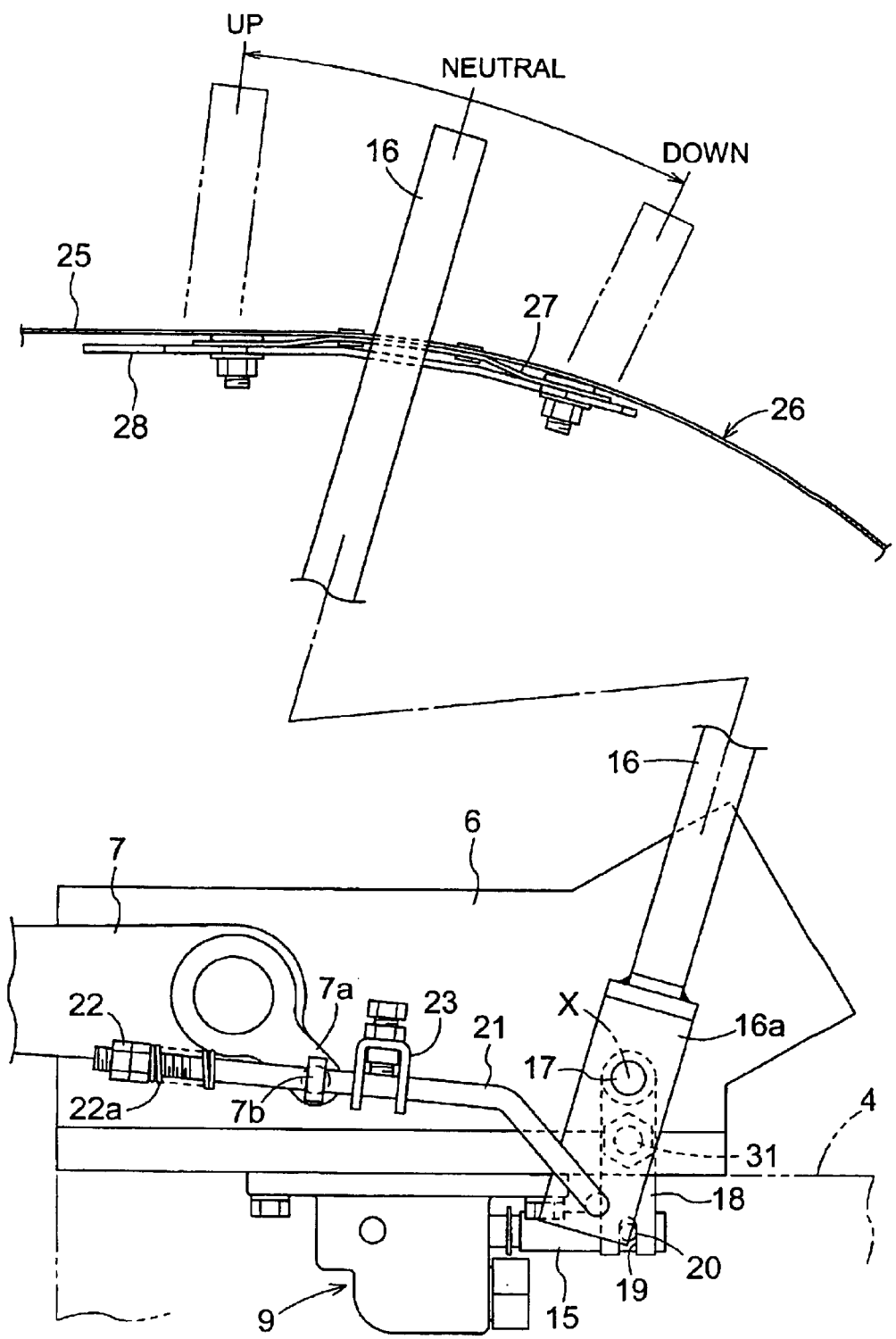
FIG. 3 is a side view showing an operative connection between a lift lever and a control valve.

Further, as shown in FIG. 3, the base end member 16a of the lift arm 16 is operably coupled via a feedback link 21 with a feedback arm 7a extending downwardly from the base of the lift arm 7. When the lift lever 16 is operated to an elevating position, in association with an upward pivotal movement of the lift arm 7, the feedback arm 7a is pivoted to the rear. And, when the lift arm 7 has reached a position immediately before the upper limit, a leading end pin 7b of the feedback arm 7a pushes, via a stroke absorbing spring 22a, a rear stopper 22 attached to the feedback link 21, whereby the feedback link 21 is pulled rearward, so that the lift lever 16 at the elevating position is pivotally returned to the neutral and automatically stopped there.

Incidentally, at an intermediate portion of the feedback link 21, there is attached a front stopper 23 which is adjustable in the fore and aft direction. Then, when the lift lever 16 is operated to a lowering position, in association with a downward pivotal movement of the lift arm 7, the feedback arm 7a is pivoted forwardly. When the lift arm is lowered to a certain height, the feed arm 7a pushes forward the feedback link 21 via the front stopper 23, so that the lift lever 16 at the lowering position is returned to the neutral and automatically stopped there. Therefore, with adjustment of this front stopper 23 to a position corresponding to a desired lowering position, the lift arm 7 can be lowered to the same desired position repeatedly and conveniently.

In the lifting operations of the lift lever 16, the spool 15 has the following various features to as to readily effect an so-called inching operation for elevating the implement at a creeping speed by minimizing the degree of opening of the control valve 9.

That is, as shown in FIG. 8, in the rising and lower sides lands of the spool 15, there are formed small parallel stepped-down portions d1, d2 of a reduced diameter (about 0.06 mm smaller than the spool diameter) extending over a predetermined stroke range (about 2 mm). And, in operational ranges where these parallel stepped-down portions d1, d2 become overlapped with open ends e1, e2 of an oil chamber (f) communicated with the cylinder port C, the pressure oil is moved through a very limited opening, thereby to operate the hydraulic cylinder 5 at the creeping speed.

More particularly, when the spool 15 is pushed from its NEUTRAL condition shown in FIG. 8 thereby to realize the "inching DOWN" condition where the parallel stepped-down portion d1 formed in the lowering side land becomes overlapped with the one open end e1 of the oil chamber (f) communicated with the cylinder port C, the oil chamber (f) and the open space around the spool become communicated with each other via a very small annular passage (having a radial width of about 0.03 mm) formed between the inner periphery of the open end e1 and the outer periphery of the parallel stepped-down portion d1, whereby the pressure oil from the cylinder port C is discharged at a very limited rate through this fine annular passage, so that the lift arm 7 is pivotally lowered at the creeping speed. This "inching DOWN" operation at a creeping speed is effected over the entire stroke where the parallel stepped-down portion d1 is overlapped with the open end e1 of the oil chamber (f).

As the spool 15 is further pushed and as shown in FIG. 10 the parallel stepped-down portion d1 formed in the lowering side land is moved away from the open end e1 toward the side of the oil chamber (f), the oil chamber (f) and the open space around the spool become communicated with each other via an annular passage of a greater cross sectional area, so that the pressure oil from the cylinder port C will be discharged by a flow amount set by the lowering-speed adjusting valve 13 and the lift arm will be downwardly pivoted at an appropriate low speed faster than the "inching DOWN" speed described above.

Figure 11:
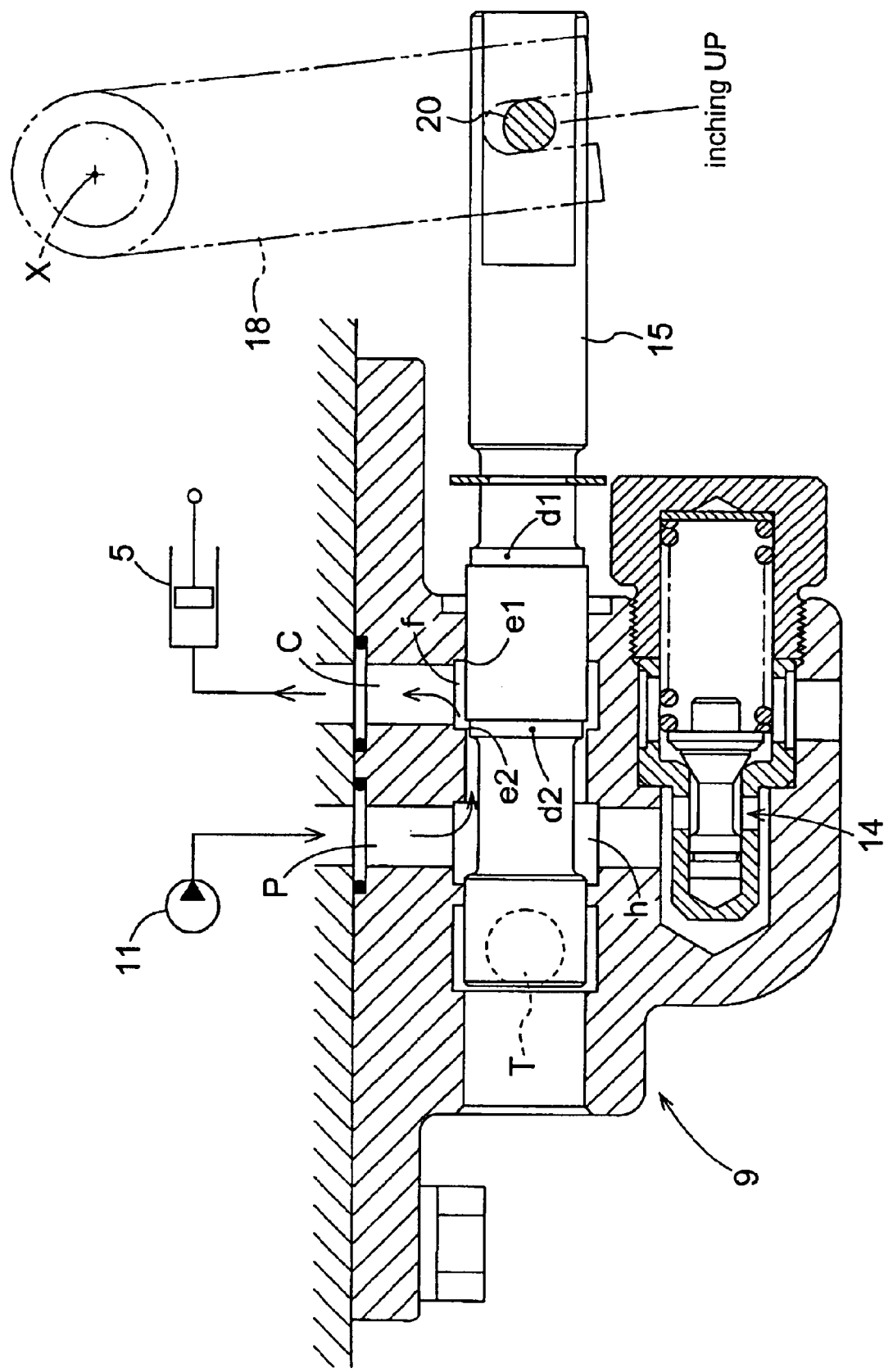
FIG. 11 is a side view in vertical section showing "inching UP" condition of the control valve.

Conversely, when the spool 15 is moved from NEUTRAL condition and provide, as shown in FIG. 11, an "inching UP" condition where the parallel stepped-down portion d2 formed in the elevating side land is overlapped with the other open end e2 of the oil chamber (f), the oil chamber (f) communicated with the cylinder port C and a further oil chamber (h) communicated with a pump port P become communicated with each other via a very small annular passage (having a radial width of about 0.03 mm) formed between the inner periphery of the open end e2 and the outer periphery of the parallel stepped-down portion d2. With this, the pressure oil from the pump port P will be discharged by a very limited amount from the cylinder port C via this very small annular passage, so that the lift arm 7 is upwardly pivoted at a creeping speed. This "inching UP" operation at a creeping speed is effected over the entire stroke where the parallel stepped-down portion d2 is overlapped with the open end e2 of the oil chamber.

As the spool 15 is further pulled and as shown in FIG. 11 the parallel stepped-down portion d2 formed in the elevating side land is moved away from the open end e2 toward the side of the oil chamber (f), the oil chamber (h) on the side of the pump port P and the oil chamber (f) on the side of the cylinder port C become communicated with each other via an annular passage of a greater cross sectional area, so that the pressure oil from the pump port P will be discharged by a large flow amount from the cylinder port C and the lift arm 7 will be upwardly pivoted at a high speed.

Figure 4:
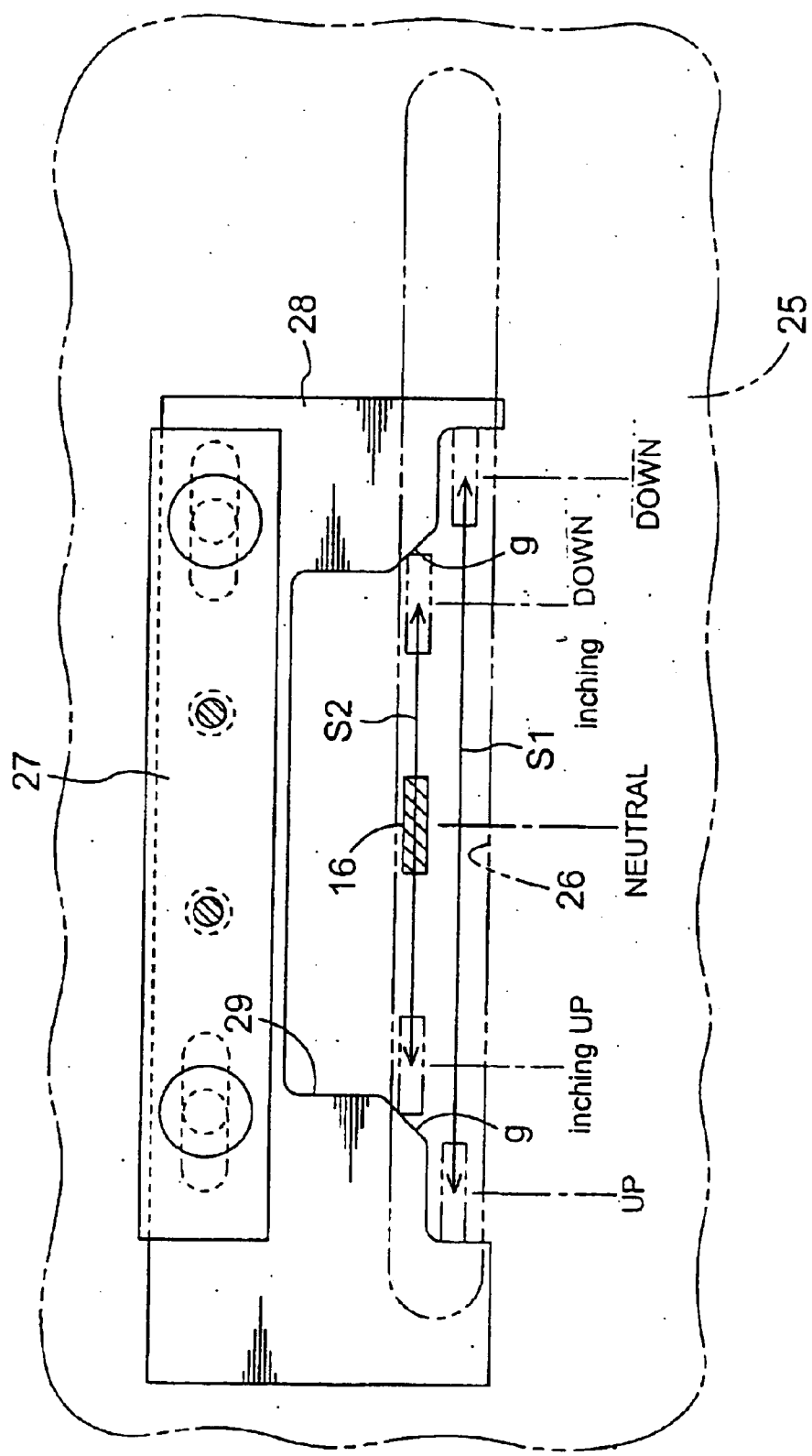
FIG. 4 is a plan view showing operational paths of the lift lever with a fender being removed.
Figure 5:
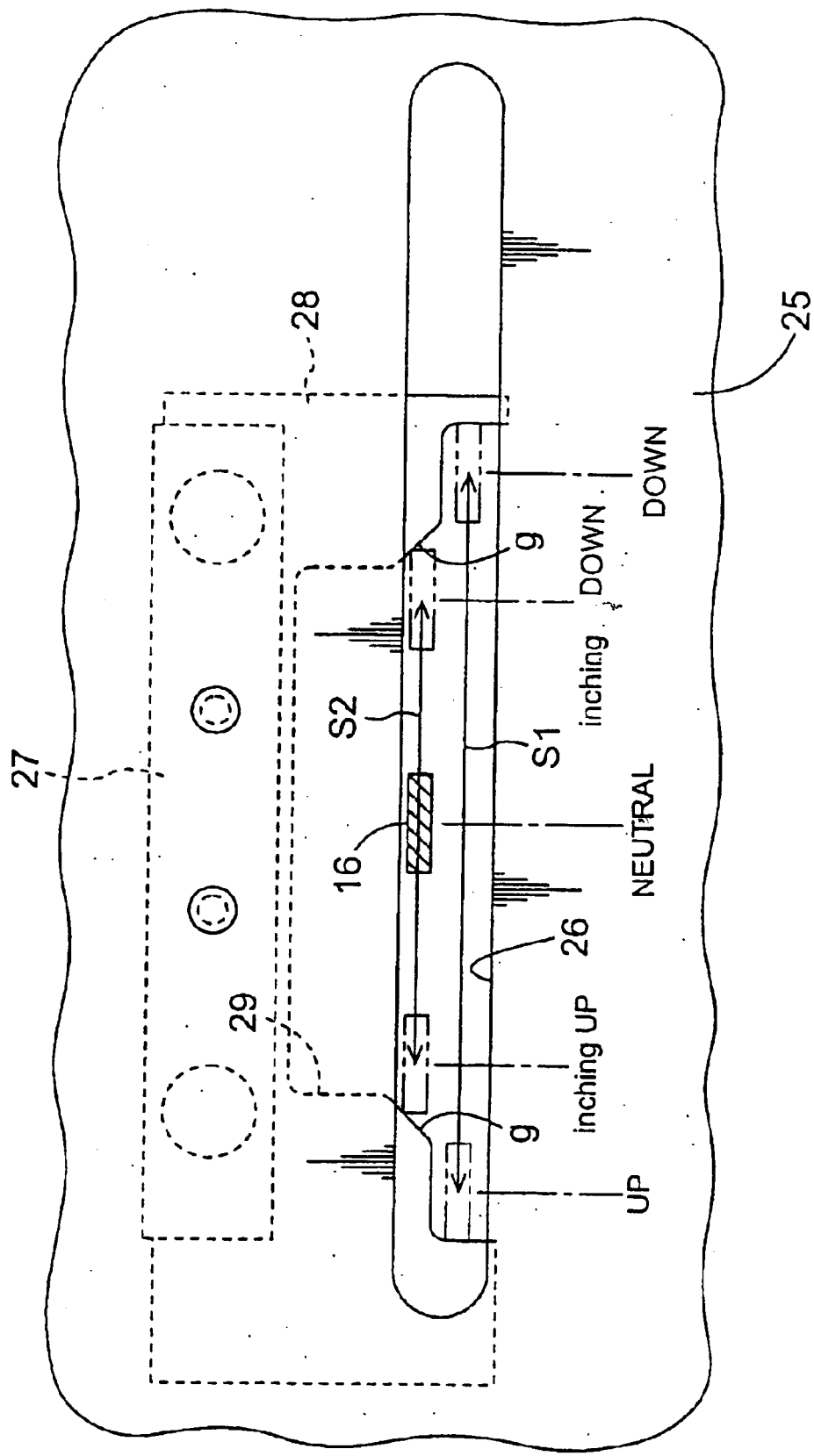
FIG. 5 is a plan view showing the operational paths of the lift lever with the fender being attached.

As shown in FIGS. 3, 4 and 5, the lift lever 16 projects upward through an operational hole 26 formed on the top of a rear-wheel fender 25. And, a lever guide 28 formed of a thick plate is attached to be adjustable in position in the fore and aft direction to a support member 27 rivet-connected to an upper inner face of the rear-wheel fender 25.

The lever guide 28 defines, as a cutout, a stepped recess 29 one on the right outer side. And, an overlapping portion between this stepped recess 29 and the operation hole 26 acts as an actual operational path for the lift lever 16. In this, the stepped recess 29 has a wide fore-and-aft width at its opening portion and a narrow width at its inner depth portion. So that, a mutually overlapping area between the wide opening portion of the stepped recess 29 and the operational hole 26 provides a main operational path S1 for operating the spool 15 of the control valve 9 over its entire stroke range, whereas a mutually overlapping area between the narrow inner depth portion of the stepped recess 29 and the operational hole 26 provides an inching operational path S2 for operating the spool 15 over a predetermined stroke range for effecting the "inching DOWN" and the "inching UP" operations described above. That is, the main operational path S1 having the longer stroke and the inching operational eteke stroke S2 having the shorter stroke are juxtaposed on the right and left sides so that the inching operation stroke S2 is located closer to a driver's seat.

More particularly, the lift lever 16 is formed of a plate lever elastically deformable to the right and left. Then, at its free condition, the lever 16 is located in the inching operational path S2. With elastic deformation of the lift lever 16 to the right outer side, the lever may be shifted into the main operational path S1. Further, opposed ends of the narrow inner-depth portion of the stepped recess 29 are configured to extend continuously via inclined chamfered guide portions (g) to the wide opening portion thereof. Then, by strongly operating the lift lever 16 which has reached the terminal end of the inching operational path S2, by the guiding function of the inclined guide portion (g), this lift lever 16 can be shifted to the end of the main operational path S1.

Figure 7:
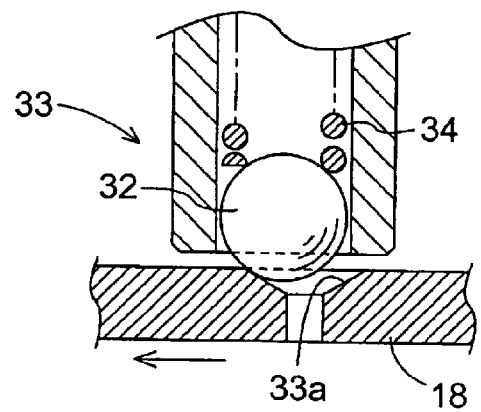
FIG. 7 is a section showing a ball detent mechanism acting as a neutral return means.

Further, the operational arm 18 is urged to its neutral position by means of a ball detent mechanism 31. In this ball detent mechanism 31, as can be apparent from FIG. 7, a ball 32 attached to the upper casing 6 is pressed by a spring 34 against a recess 33 formed in a lateral face of the operational arm 18 and having inclined faces 33a at opposed sides thereof. The mechanism provides the automatic return function for the lift lever 16 as the ball 32 slides or rolls down along this inclined face 33a. This neutral return function is provided over the entire length of the inching operational path S2 of the lift lever.

Therefore, at the lowering or elevating position where the lift lever 16 is located at a terminal end of the main operational path S1, the lever 16 can be maintained at that operational position. On the other hand, when the lift lever 16 currently located at the lowering or elevating position is operated backward to ride over the terminal end of the inching operational path S2 to the neutral side, the lift lever 16, by its own elastic resilience, is shifted into the inching operational path S2 and then with the effect of the returning urging force of the ball detent mechanism 31, the lever is automatically moved to the neutral position.

[Other Embodiments]

The present invention may be alternatively embodied as follows.

(1) In the foregoing embodiment, the lift lever 16 is laterally urged toward the inching operational path S2 by utilizing the elastic resilience of this lever per se. Instead, a lateral switchover pivot may be provided at an intermediate portion of the lift lever 16, with a portion of the lever upwardly of this lateral switchover pivot being laterally urged by a separate spring.

(2) The neutral return means effective in the inching operational path S2 may directly affect the spool 15 of the control valve 9.

(3) The construction for allowing the operator to recognize whether the lift lever 16 is located in the inching operational path S2 or not though the operational feed of the lever may be provided also by increasing the operational resistance of the lever 16 only at the opposed terminal ends of the main operational path S1 away from the inching operational path S2.

The invention may be embodied in any other way than disclosed in the above detailed description without departing from the essential spirit thereof defined in the appended claims. All modifications apparent for those skilled in the art are intended to be encompassed within the scope of the invention defined by the claims.

What is claimed is:

1. A manual control mechanism for a lift unit having a lift arm and a hydraulic cylinder for lifting the lift arm up and down, comprising:

a control valve configured as a three-position switchover valve for selectively providing lowering, neutral and elevating conditions according to a spool position for controlling movement of the hydraulic cylinder;

a lift lever for manually operating the control valve; and an operational path for guiding operational displacement of the lift lever;

wherein said operational path includes an inching operational path for operating the hydraulic cylinder at a creeping speed by slightly opening a port of the control valve and a main operational path for operating the control valve over an entire stroke range thereof; and wherein an operational feel when the lift lever is operationally displaced along said inching operational path is different from an operational feel when the lift lever is operationally displaced along said main operational path.

2. The manual control mechanism according to claim 1, wherein said main operational path extends parallel with and by a greater length than said inching operational path; and mutually opposed sides of said main operational path and said inching operational path are open to allow movement of the lift lever between the main operational path and the inching operational path.

3. The manual control mechanism according to claim 2, wherein said manual operation mechanism is mounted on a tractor; and said inching operational path is disposed close to a driver's seat of the tractor and said main operational path is disposed distant from the driver's seat.

4. The manual control mechanism according to claim 2, wherein said lift lever is laterally urged from the main operational path toward the inching operational path.

5. The manual control mechanism according to claim 2, wherein at each opposed end of the inching operational path, there is formed an inclined guide portion for shifting the lift lever to the main operational path.

6. The manual control mechanism according to claim 2, wherein said inching operational path incorporates neutral return means for automatically returning the lift lever to an operational displaced position corresponding to a neutral position of said control valve.

7. The manual control mechanism according to claim 6, wherein said lift lever is subjected to the neutral return effect from said neutral return means substantially over an entire stroke range of the inching operational path.

8. The manual control mechanism according to claim 1, wherein a spool of said control valve and said lift lever are directly coupled with each other.

* * * * *

UNITED STATES PATENT AND TRADEMARK OFFICE
CERTIFICATE OF CORRECTION

PATENT NO.   : 6,854,483 B2
DATED        : February 15, 2005
INVENTOR(S)  : Takekata et al.

It is certified that error appears in the above-identified patent and that said Letters Patent is hereby corrected as shown below:

<u>Column 7,</u>
Line 66, "operational eteke stroke" should read -- operational stroke --.

<u>Column 8,</u>
Line 2, "driver's seat" should read -- driver's seat 24 --.

Signed and Sealed this

Thirteenth Day of September, 2005

JON W. DUDAS
*Director of the United States Patent and Trademark Office*